United States Patent
Meinecke, Jr.

[11] 3,752,496
[45] Aug. 14, 1973

[54] AXLE ASSEMBLY FOR VEHICLES

[76] Inventor: Clarence A. Meinecke, Jr., P.O. Box 162, Gowrie, Iowa

[22] Filed: Aug. 9, 1971

[21] Appl. No.: 170,160

[52] U.S. Cl.......... 280/81 R, 180/24.02, 280/43.17, 280/150 A, 280/405 R
[51] Int. Cl. ................................................ B60s 9/18
[58] Field of Search ................. 280/81 R, 405 R, 280/405 B, 43, 43.17, 150 A, 150 F; 180/24.02

[56] References Cited
UNITED STATES PATENTS

| 3,298,706 | 1/1967 | Lyall | 280/81 R |
| 2,754,129 | 7/1956 | Eckroad | 280/405 R X |
| 3,436,096 | 4/1969 | Rogge | 280/34 R |
| 3,290,051 | 12/1966 | O'Brien et al. | 280/43.12 |
| 3,544,127 | 12/1970 | Dobson | 280/43.17 |
| 2,902,289 | 9/1959 | North | 280/81 R |
| 3,664,679 | 5/1972 | Hille | 280/81 R |
| 3,191,963 | 6/1965 | Prichard | 280/81 R |

Primary Examiner—Kenneth H. Betts
Assistant Examiner—John P. Silverstrim
Attorney—Henderson et al.

[57] ABSTRACT

An axle assembly attachable to a vehicle such as a pickup truck to supplement the load-carrying capacity of the vehicle and to stabilize the ride. The assembly extends from the rear of the vehicle and includes a pair of wheels adjustably mounted to a supporting frame. The wheels may be raised out of ground engagement or lowered to provide varying degrees of load support by action of a jacking means carried by the supporting frame and capable of rotating a torque-transmitting member connected to the axle through motion-dampeners. A vehicle bumper is removably attached to the rear of the assembly, and the entire assembly is pinned to mounting brackets secured to a vehicle frame.

3 Claims, 7 Drawing Figures

PATENTED AUG 14 1973 3,752,496
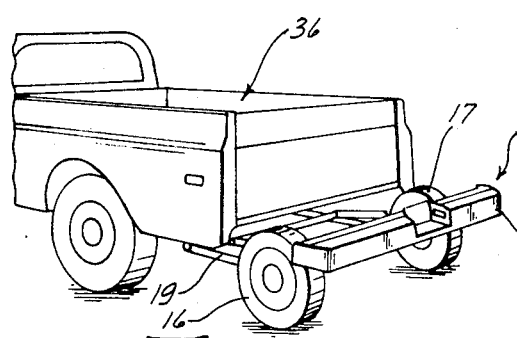
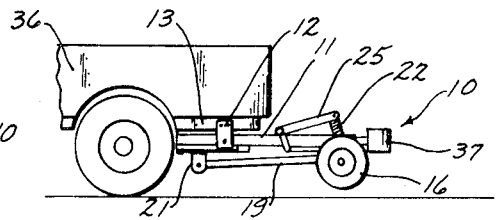
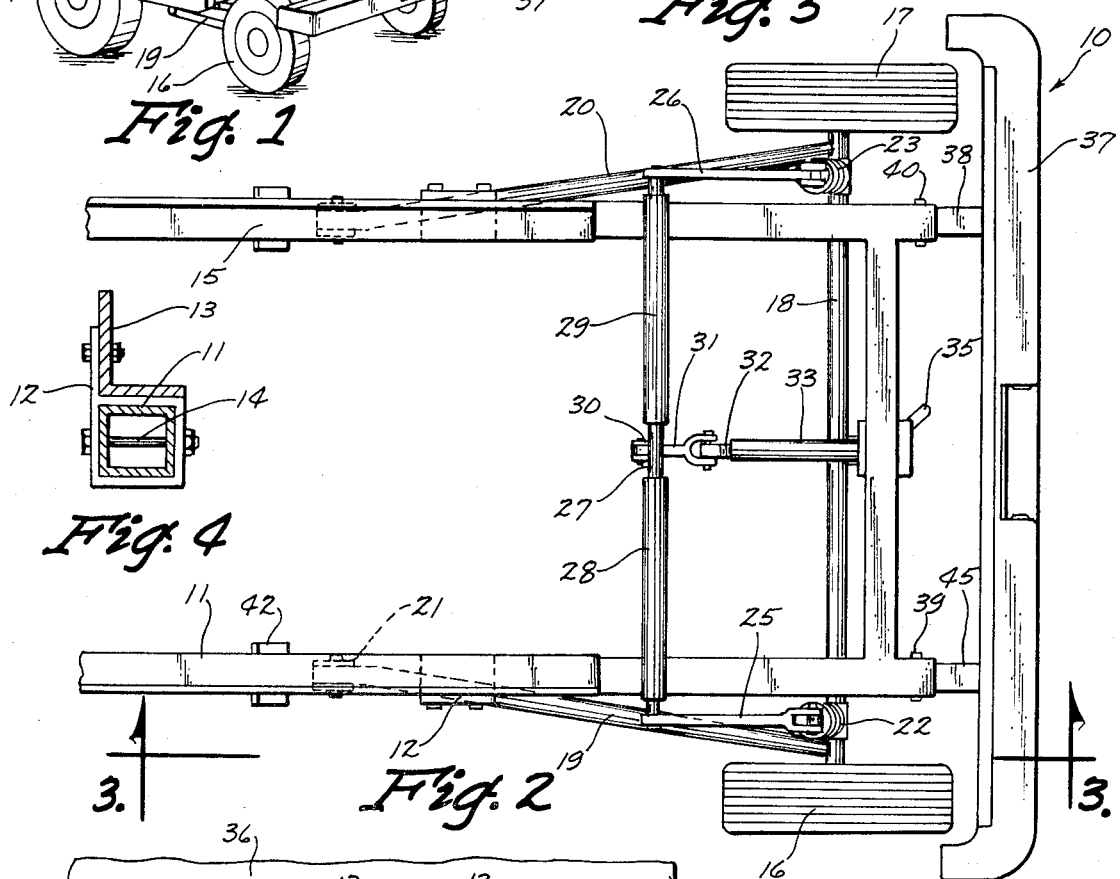
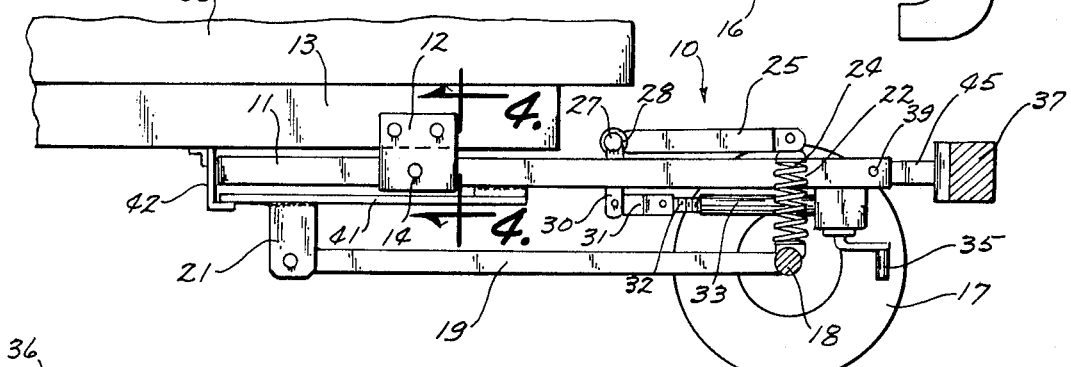
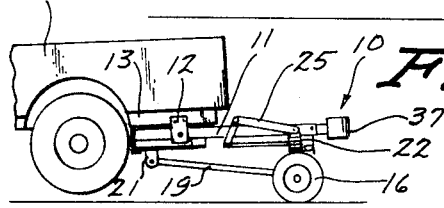
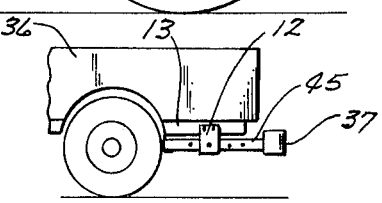

AXLE ASSEMBLY FOR VEHICLES

BACKGROUND OF THE INVENTION

This invention relates to a device for increasing the capacity of load-carrying vehicles, and more particularly to an axle assembly attachable to a vehicle such as a pickup truck to supplement the load-carrying capacity of the vehicle and to stabilize the ride when the vehicle is carrying a heavy load such as a camper body.

It is a common practice to mount a camper body on a pickup truck. Such camper bodies often overload the pickup, and cause the center of gravity to be shifted such that the pickup becomes very unstable during travel. Additionally, such camper bodies often extend beyond the bed of the pickup truck and are vulnerable to damage from rear end collisions.

A need therefore exists for a device that will stabilize a pickup truck carrying a camper body during travel, will supplement the load-carrying capacity of the truck, and will provide protection to the overhanging portion of the camper body.

An early attempt to provide an extension for trucks to supplement the load-carrying capacity of a truck is described in U.S. Pat. No. 1,366,771, which illustrates an extension frame extending from the rear of a truck bed and supported by a pair of wheels. More recently, an extension for a pickup truck was described in U.S. Pat. No. 3,436,096, which illustrates a detachable axle assembly for a pickup truck to improve the stability and load-carrying capacity of the truck. While the device described therein provides some support for a camper body on a pickup truck in transit, nevertheless a need has existed for an axle assembly or extension which could be quickly and positively attached to a truck frame and which could be adjusted to suit varying conditions of use.

It is an object of this invention to provide an axle assembly which can be removably attached to a truck frame for stabilizing the ride and supplementing the load-carrying capacity of the truck and which can be easily adjusted to meet varying load conditions.

It is a further object of the invention to provide an axle assembly having an adjustment whereby the axle can be raised out of ground contact when no load is present such that the assembly does not interfere with the normal handling of the truck during unloaded operation.

SUMMARY OF THE INVENTION

According to this invention, an axle assembly is provided which is quickly and easily attached to or removed from a mounting means secured to a truck frame. The assembly extends rearwardly of the truck bed, and may include a detachable bumper which can be attached as the truck bumper when the axle assembly is not attached to the truck. The axle assembly includes at least one pair of wheels which can be adjusted out of ground contact when no heavy load is carried by the truck and can be adjusted to support varying amounts of a heavy load such as a camper body.

The assembly of this invention is rugged, simple to operate, and flexible for different conditions of use. It comprises a supporting frame which is attachable to suitable mounting brackets affixed to a truck frame. Motion-dampening means are provided for increasing the stability of the ride, and an adjusting means is provided for setting the assembly to provide for specific load conditions.

BRIEF DESCRIPTION OF THE DRAWINGS

FIG. 1 is a perspective view showing the assembly of the invention attached to a pickup truck;

FIG. 2 is a top plan view of the assembly;

FIG. 3 is a side elevation taken along lines 3—3 of FIG. 2;

FIG. 4 is a cross-sectional view of a mounting bracket taken along lines 4—4 of FIG. 2;

FIG. 5 is a side elevation showing the assembly attached to a pickup with the assembly wheels raised;

FIG. 6 is a side elevation showing the assembly attached to a pickup with the assembly wheels lowered; and FIG. 7 is a side elevation of a pickup without the assembly, and with a bumper mounted in the assembly mounting bracket.

DESCRIPTION OF THE PREFERRED EMBODIMENT

The preferred embodiment will be described by reference to the several views of the drawings, but it will be apparent that modifications and variations could be made in many instances without departing from the true scope of the invention.

FIGS. 1, 5 and 6 illustrate the axle assembly according to the invention showing the manner in which it is used as an extension of a load-carrying vehicle such as a pickup truck. As best seen in FIGS. 5 and 6, the axle assembly, shown generally as 10 includes a member 11 which is part of a supporting frame for axle assembly 10. The member 11 extends through an opening in mounting bracket 12 which is secured to truck frame 13. The member 11 is fixedly attached by a pin 14 extending through matching openings in mounting bracket 12 and supporting frame member 11. The pin 14 may be bolted as shown in FIG. 4, or may be secured by a spring clip, cotter pin, or other suitable means allowing for quick attachment and removal of the axle assembly. Similar structure is provided for member 15 of the supporting frame on the opposite side thereof. It will be apparent that the axle assembly 11 could be permanently attached to the truck frame 13, such as by welding, but it is much preferred that the quick-attach and quick-detach feature be retained as illustrated.

The detailed construction of the preferred embodiment of axle assembly 10 is best shown in FIGS. 2 and 3. As seen in FIG. 2, a pair of wheels 16 and 17 are mounted on an axle 18. Elongated pivot arms 19 and 20 are fixed at one end to axle 18 and pivotally connected at their other end to members connected to the supporting frame. One of these members 21 is shown in FIG. 3.

Also attached to axle 18 are motion dampening means 22 and 23. Motion dampeners 22 and 23 may comprise conventional hydraulic telescoping shock absorbers, and preferably are of the overload type which include auxilliary coil springs 24 associated therewith. The upper ends of the motion dampeners 22 and 23 are connected to one end of radius arms 25 and 26. The other ends of radius arms 25 and 26 are rigidly fixed to opposite ends of a torque-transmitting means shown as shaft 27 which is rotatably carried in tubular sleeves 28 and 29 affixed to supporting frame members 11 and 15 respectively. One end of a pivot arm 30 is secured to the center of shaft 27 and at the other end to linkage 31. Linkage 31 in turn is pinned to piston 32 of jack 33 which is mounted on cross-member 34 of the supporting frame. It will be seen that upon operation of the jack 33, such as by turning handle 35, the piston 32, linkage 31, and pivot arm 30 will act to rotate shaft 27 in sleeves 28 and 29. In turn, radius arms 25 and 26 rotate with shaft 27 to raise or lower axle 18 with respect to the supporting frame.

The raising and lowering of axle 18 is best illustrated in FIGS. 5 and 6. In FIG. 5, shaft 27 has been rotated counter-clockwise to the point that the wheels are lifted out of ground contact. This position is useful for traveling without a load on truck 36. When a heavy load is to be carried by truck 36, the jack is operated to rotate axle 27 clockwise until the wheels of the axle assembly support the desired portion of the load. This position is shown somewhat exaggerated in FIG. 6. While it might be possible to raise the truck wheels out of ground contact as shown in FIG. 6, normally the axle assembly does not carry such a large load. It should be clear that the amount of load to be carried by the axle assembly can be selected by operation of the jack 33.

The axle assembly of this invention is particularly suitable for pickup trucks carrying camper bodies that overhang the rear end of the pickup bed. For such use, a bumper 37, which may be the original bumper from the pickup truck, is provided with tongues 45 and 38 (FIG. 2) which are received in supporting frame members 11 and 15 and pinned thereto by pins 39 and 40, which may be the same type as are used to fasten the axle assembly to the mounting brackets. The bumper 37 then protects an overhanging camper body from damage due to rear end collisions or the like. Tongues 45 and 38 may have a series of pin holes spaced thereon so that bumper 37 can be fastened at different positions to allow for varying amounts of load overhang.

As best seen in FIG. 3, the supporting frame includes a member 41 extending parallel to and below the forward portion of supporting frame member 11. Pivot connection member 21 is attached to the forward end of member 41. This particular construction allows the supporting frame member 11 to be inserted in the opening of mounting bracket 12. To provide additional rigidity, an L-shaped member 42 may be attached to truck frame 13 for supporting member 41 as seen in FIG. 2. Similar structure is provided for supporting frame member 15.

The preferred embodiment of the invention as described above allows for removing the bumper 37 from the axle assembly and attaching it to the mounting bracket 12 as shown in FIG. 7 when the axle assembly is not being used. As pointed out above, the bumper 37 can be the original truck's bumper, adapted for pinned connection to either the mounting brackets or the supporting frame.

The operation of the above described device will now be described. First, bumper 37 is removed from the truck. The axle assembly 10 is then attached to the truck by inserting supporting frame members 11 and 15 into the openings in mounting brackets fixed to the truck frame and inserting pins 14 into mating openings in the frame members and the mounting brackets. The jack 33 is then operated to adjust the axle assembly for the desired amount of load to be carried thereby. This may be done either before or after the load is on the truck, since jack handle 35 is accessible in either case. The bumper is then attached to the rear of the axle assembly if it was not already in place, and the assembly is ready for operation.

The construction and operation of the preferred embodiment having been described, it is seen that this invention provides an assembly for stabilizing the ride and assisting in load-carrying of a vehicle such as a pickup truck carrying a camper body. The device is quickly attached and removed, and can be operated out of ground contact or in ground contact for carrying varying amounts of load.

Many alternatives could be utilized in various parts of the assembly. For example, the jack could be hydraulic, or could be servo-operated. The shaft 27 and radius arms 25 and 26 are described as rigid, but a torsion bar could be substituted therefor. A platform (not shown) to fit the particular load situation might be attached to the supporting frame, and many other variations within the scope of the invention are possible. For this reason, the foregoing description is to be considered illustrative of the invention, rather than limiting.

I claim:

1. An axle assembly for attachment to the frame of a pickup truck to stabilize the ride and to supplement the load-carrying capacity of the pickup truck comprising:

a supporting frame adapted to be rigidly and detachably connected to a vehicle frame at each side thereof;

a pair of wheels supported by an axle;

means at each side of the supporting frame pivotally connected thereto and rigidly connected to said axle;

motion dampening means attached to each end of the axle;

a shaft rotatably supported by the supporting frame and having radius arms extending from each end thereof, the radius arms being connected to the motion dampening means; and means for selectively positioning said shaft relative to the supporing frame and for maintaining said shaft in a selected position relative to the supporting frame.

2. The assembly of claim 1 wherein the means for selectively positioning said shaft and for maintaining said shaft in a selected position comprises a manually operated jacking device mounted to the supporting frame and operatively connected to said shaft for positioning said shaft and for holding said shaft in a selected position.

3. The assembly of claim 1 wherein the supporting frame includes elongated members insertable in mounting brackets affixed to a truck frame and connectable thereto by pin means.

* * * * *